(12) United States Patent
Elliot et al.

(10) Patent No.: US 8,509,391 B2
(45) Date of Patent: *Aug. 13, 2013

(54) WIRELESS VOIP NETWORK FOR SECURITY SYSTEM MONITORING

(75) Inventors: Harvey Alexander Elliot, Ojai, CA (US); Bryan Field Elliot, Ojai, CA (US); Daniel J. Elliot, Ojai, CA (US)

(73) Assignee: Numerex Corp., Atlanta, GA (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/004,917

(22) Filed: Jan. 12, 2011

(65) Prior Publication Data

US 2011/0169628 A1 Jul. 14, 2011

Related U.S. Application Data

(63) Continuation-in-part of application No. 12/018,724, filed on Jan. 23, 2008, now Pat. No. 8,369,487, which is a continuation-in-part of application No. 11/517,025, filed on Sep. 7, 2006, now Pat. No. 7,613,278, which is a continuation-in-part of application No. 11/226,857, filed on Sep. 14, 2005, now Pat. No. 7,593,512, and a continuation-in-part of application No. 10/861,790, filed on Jun. 7, 2004, now Pat. No. 7,440,554, which is a continuation-in-part of application No. 10/840,280, filed on May 7, 2004, now abandoned, which is a continuation-in-part of application No. 10/462,708, filed on Jun. 17, 2003, now Pat. No. 7,245,703, application No. 13/004,917, which is a continuation-in-part of application No. 12/504,709, filed on Jul. 17, 2009.

(60) Provisional application No. 60/651,662, filed on Feb. 11, 2005, provisional application No. 60/389,960, filed on Jun. 20, 2002.

(51) Int. Cl.
*H04M 11/00* (2006.01)
*H04M 11/04* (2006.01)

(52) U.S. Cl.
CPC .................................... *H04M 11/04* (2013.01)
USPC ........................................................... 379/37

(58) Field of Classification Search
USPC ......................................... 379/37–45, 90.01
See application file for complete search history.

(56) References Cited

U.S. PATENT DOCUMENTS

| | | | |
|---|---|---|---|
| 4,465,904 A | 8/1984 | Gottsegen et al. |
| 4,692,742 A | 9/1987 | Raizen et al. |
| 5,134,644 A | 7/1992 | Garton et al. |
| 5,365,568 A | 11/1994 | Gilbert |
| 5,463,595 A | 10/1995 | Rodhall |
| 5,796,633 A | 8/1998 | Burgess et al. |

(Continued)

*Primary Examiner* — Stella Woo
(74) *Attorney, Agent, or Firm* — King & Spalding

(57) ABSTRACT

A Voice over IP (VoIP) module is used to connect an alarm system to a monitoring station over the Internet. A built-in wireless or Ethernet over A/C power component is described, such that the Voice-over-IP equipment can be placed at a distance from a router, without the need to run an Ethernet cable from the VoIP equipment to the router. This arrangement is useful, as in many cases, the customer's security system is hidden within a closet, or else placed within the home or business at a significant distance from their Internet connection and router. The present invention accomplishes this by adding a built-in WiFi (wireless) radio, or a built-in Ethernet over Power circuit, into the Voice-over-IP equipment installed in the home or business.

20 Claims, 5 Drawing Sheets

(56) References Cited

U.S. PATENT DOCUMENTS

| | | |
|---|---|---|
| 5,808,547 A | 9/1998 | Carney |
| 5,877,684 A | 3/1999 | Lu |
| 5,923,731 A | 7/1999 | McClure |
| 6,075,451 A | 6/2000 | Lebowitz et al. |
| 6,215,404 B1 | 4/2001 | Morales |
| 6,272,212 B1 | 8/2001 | Wulforst et al. |
| 6,288,642 B1 | 9/2001 | Dohrmann |
| 6,311,072 B1 | 10/2001 | Barclay et al. |
| 6,381,307 B1 | 4/2002 | Jeffers et al. |
| 6,452,490 B1 | 9/2002 | Garland et al. |
| 6,493,435 B1 | 12/2002 | Petricoin |
| 6,574,480 B1 | 6/2003 | Foladare et al. |
| 6,577,234 B1 | 6/2003 | Dohrmann |
| 6,603,845 B2 | 8/2003 | Jensen et al. |
| 6,661,340 B1 | 12/2003 | Saylor et al. |
| 6,683,526 B2 | 1/2004 | Bellin |
| 6,829,478 B1 | 12/2004 | Layton et al. |
| 6,831,557 B1 | 12/2004 | Hess |
| 7,009,519 B2 | 3/2006 | Leonard et al. |
| 7,406,710 B1 | 7/2008 | Zellner et al. |
| 7,593,512 B2 * | 9/2009 | Elliot et al. ............ 379/39 |
| 7,734,020 B2 * | 6/2010 | Elliot et al. ............ 379/37 |
| 2002/0147982 A1 | 10/2002 | Naidoo et al. |
| 2002/0177428 A1 | 11/2002 | Menard et al. |
| 2003/0071724 A1 * | 4/2003 | D'Amico ............ 340/531 |
| 2003/0128115 A1 | 7/2003 | Giacopelli et al. |
| 2004/0086093 A1 | 5/2004 | Schranz |
| 2006/0176167 A1 | 8/2006 | Dohrmann |
| 2006/0239250 A1 | 10/2006 | Elliot et al. |
| 2007/0115930 A1 | 5/2007 | Reynolds et al. |
| 2007/0155412 A1 | 7/2007 | Kalsukis |
| 2008/0117029 A1 | 5/2008 | Dohrmann et al. |
| 2009/0077622 A1 * | 3/2009 | Baum et al. ............ 726/1 |
| 2009/0274104 A1 * | 11/2009 | Addy ............ 370/329 |

* cited by examiner

WIRELESS VOIP NETWORK FOR SECURITY SYSTEM MONITORING

CROSS-REFERENCE TO RELATED APPLICATIONS

The present application is a Continuation-In-Part application of U.S. patent application Ser. No. 12/018,724 (ELLIOT-0008), filed on Jan. 23, 2008 and incorporated herein by reference, which in turn is a Continuation-In-Part of U.S. patent application Ser. No. 11/517,025 (ELLIOT-0007), filed on Sep. 7, 2006, and incorporated herein by reference; which in turn is a Continuation-In-Part of U.S. patent application Ser. No. 11/226,857 (ELLIOT-0005) filed on Sep. 14, 2005 and incorporated herein by reference; patent application Ser. No. 11/226,857 in turn claims priority from Provisional U.S. patent application Ser. No. 60/651,662 (ELLIOT-0004) filed on Feb. 11, 2005 and incorporated herein by reference; patent application Ser. No. 11/226,857 is also a Continuation-In-Part (CIP) of co-pending application Ser. No. 10/861,790 (ELLIOT-0003), filed on Jun. 7, 2004, and incorporated herein by reference; patent application Ser. No. 11/226,857 is in turn a Continuation-In-Part of U.S. patent application Ser. No. 10/840,280 (ELLIOT-0002) filed on May 7, 2004, and incorporated herein by reference, which in turn is Continuation-In-Part of U.S. patent application Ser. No. 10/462,708 (ELLIOT-0001) filed on Jun. 17, 2003, (now U.S. Pat. No. 7,245,705) and incorporated herein by reference, which in turn claims priority from Provisional U.S. patent application Ser. No. 60/389,960 (ELLIOT-0001P), also incorporated herein by reference; The present application is also a Continuation-In-Part (CIP) of co-pending U.S. patent application Ser. No. 12/504,709 (ELLIOT-0009) filed on Jul. 17, 2009 and incorporated herein by reference.

FIELD OF THE INVENTION

The present invention relates towards alarm and security system monitoring. In particular, the present invention is directed toward a mechanism, system, and method for creating a private Voice-over-IP (VoIP) network specially suited for the monitoring of security systems (burglar alarms, fire alarms, and the like) and other types of communications. In the present application, a wireless or powerline adaptor is built-in to the VoIP interface, such that the alarm module may be physically remote from the network, without having run network cabling between the two.

BACKGROUND OF THE INVENTION

More and more consumers are switching to Voice-over-IP (VoIP) for telephone service, such as Vonage™ or AT&T CallVantage™. FIG. 4 is a block diagram of a typical Voice over IP (VoIP) system. In the system of FIG. 4, a telephone 210, which may comprise a standard analog POTS (Plain Old Telephone Service) telephone, is coupled to a Voice over IP adapter, such as the LINKSYS® RT31P2, popularly used by Vonage™ and other VoIP providers. Note that telephone 210 may also comprise a "soft" telephone, which may be implemented through a user's computer or the like VoIP adapter 220 converts analog signals from telephone 210 into digital signals and transmits them over broadband Internet link 230. Broadband Internet link 230 may comprise a connection through a cable modem, DSL, fiber optic, T2, or other high-speed connection. Other connections, such as satellite uplinks may work, with some limited success. Dialup and other slow-speed connections may not work at all. Digitized signals from VoIP adapter 220 are received at servers at Voice-over-IP service provider 240, which may comprise Vonage™ or other VoIP telephone company. The digital signals are converted back to analog, and the call then routed to a call recipient 250 over an analog POTS line (if the recipient is not a VoIP subscriber) or sent digitally to the subscriber via the Internet in a similar manner in which the call was received.

These VoIP telephone companies have been very successful in providing a digital communications service which accurately emulates standard analog POTS service. Users can plug in existing analog telephones and even telephone systems and operate the equipment in a manner identical to POTS service, with no perceived artifacts or effects. However, users have reported problems when attempting to use VoIP with fax machines, modems, credit card "swipe" machines, and alarm systems.

Voice-over-IP service may impact the reliability of a security (alarm) system by interfering with its ability to report alarms to a consumer's monitoring station. Although Voice-over-IP services are excellent for voice communication, they may not be suited for transmitting alarm system data to an alarm monitoring company. As a result, many alarm monitoring companies simply do not accept customers who use Voice-over-IP. Some consumers report that their alarm systems will work with VoIP, while others have difficulty. On-line forums as such as the Vonage™ on-line forum have entire discussion forums related to such consumer difficulties. Thus, using an alarm system with VOIP service is a recognized problem in the art.

Prior Art security systems such as alarm, fire, and other system, typically dial a telephone number to report security events to a central station. Many owners of security systems also use Voice-over-IP (VoIP) services, such as Vonage™ VoIP or the like, which create a virtual phone network on top of broadband Internet technology. When an alarm system is used in conjunction with a typical Voice-over-IP service, the security system will dial a standard telephone number corresponding to the customer's alarm monitoring service. The Voice-over-IP service, in turn, will route this "virtual" phone call onto a standard telephone line, and re-dial the originally intended telephone number, thereby connecting the call.

Many users of alarm systems, credit card swipe machines, and the like, report problems when attempting to use such hardware with VoIP systems. The apparatus may dial the wrong number, or the system might not provide the proper bandwidth or signal clarity to properly send the necessary signals to the central station or dialed number. Similar problems can occur when using Prior Art fax machines and other communications devices (e.g., 56K dialup modems and the like) with VoIP networks.

These types of errors may occur due to multiple layers of translation back and forth between digital (Internet technology), and analog (telephone) system. As a result, alarm and other types of signals are frequently incorrectly received. For the VoIP provider, such concerns are important if the VoIP service is to be marketed as a replacement for standard POTS (Plain Old Telephone Service) lines. One method of overcoming this problem has been to provide higher bandwidth lines specifically for such applications (e.g., dedicated fax line). However, such higher bandwidth lines require a consistently robust broadband connection and can slow down other users on the broadband connection. Thus, an alternative solution to such brute force techniques is required in the art.

In addition, even if an alarm system can be made to work with an existing VoIP telephone network, the system suffers from the same problem as Prior Art dialup service. Namely, when the alarm dials out, it seizes the phone line, making it impossible for the consumer to call out at the same time. In an emergency or even in the event of a false alarm, this can be frustrating or even dangerous. If the alarm is trying to dial out, and the consumer is trying to contact 911, each may end up blocking the other. The alarm will continue to try dialing out, which may in turn continue to block the consumer's repeated attempts to dial. In a false alarm scenario (where the consumer is trying to cancel the alarm) this may be merely frustrating. In a medical or other emergency, it may be disastrous.

Prior Art alarm systems are also limited in many regards in that by using dialup communications, they cannot be monitored in real time. If a burglar disables an alarm system, the alarm company may have no way of knowing the system is off-line. Many alarm systems are programmed to dial up the monitoring station once a day (or at another periodic interval) to report system status. If the status call is not received over a period of time, the consumer may be contacted to inform them their alarm is not operating properly. In practice, this may mean that 24 hours or more may elapse before a malfunctioning or disabled alarm is detected and reported.

Another problem with Prior Art alarm systems, which is not widely reported is that they are ridiculously easy to defeat. A burglar need only disconnect the POTS phone lines at the residence to prevent the system from reporting a break-in or other alarm. Most phone lines are conveniently located at the side of house and pass through a Network Interface Box (NIB). The phone lines may be disconnected easily at the box (by unplugging the RJ-11 jacks) or by simply cutting the wires. Once inside, the burglar can quickly disarm the alarm siren (e.g., by ripping it from the wall or disconnecting the wires) so that neighbors are not alerted.

Some alarm companies have tried to overcome this limitation by using wireless communications as the uplink for the alarm system. Such systems are fairly expensive and require that wireless service be available in the area. Wireless signals are subject, however, to electronic jamming and other forms of defeat (e.g., remove antenna). Moreover, many wireless systems also use the periodic status reporting technique and thus a disabled alarm may not be detected for hours or days.

Another drawback of Prior Art alarm systems is the inability of the consumer to perform remote self-monitoring of system status or remotely arm the system. The systems are generally programmed to only dial the alarm company and/or only the alarm company may dial into the system, the consumer has no idea what the status of the system is, other than what is reported verbally by the alarm company. Alarm systems are basically computer systems, and it would be advantageous if a consumer could access their alarm system and/or be advised of the status of their alarm system via telephone, computer, or the like.

SUMMARY OF THE INVENTION

The present invention is a mechanism for placing an alarm receiver (at security system central station) directly onto a private Voice-over-IP network shared by the customer, thereby eliminating the need for a Voice-over-IP system to re-dial the central station over a standard telephone line. Because both the security system and the alarm receiver are on the same Voice-over-IP network, and because neither end is connected to a standard telephone line (nor do alarm signals ever pass over standard telephone lines), errors are reduced dramatically, and overall response time is improved.

In addition, security systems typically offer a feature to allow their owners to call the security system, and using touchtones (e.g., dual tone multiple frequency, or DTMF) or other mechanisms, allow them to arm, disarm, or listen-in to their security system. The present invention circumvents the standard telephone system, thereby precluding this form of dial-in access. To address this, another embodiment of this invention designates a standard telephone number to become the "Outside Access Point" (OAP) for an alarm system. By dialing the OAP from a regular telephone, the present invention will route the call onto the private Voice-over-IP network, and subsequently to the security system. In this manner, alarm reporting can be performed over the more reliable Voice-over-IP network, while owner dial-in (for reasons of arming, disarming, listen-in, and the like) can be performed with a standard telephone.

Security systems also typically include functions to dial a standard telephone number or pager to notify the owner of a security event, after it has been reported to an alarm central station. In another embodiment of the present invention, a "virtual phone number" in the Voice-over-IP network can be dialed by the alarm system, which will be routed to the standard telephone network and a real phone number dialed, in order to engage in this owner reporting. In this manner, security events can be reported to the alarm central station using the more reliable Voice-over-IP network, and subsequently, the owner of the security system can be notified via phone call of the event using pre-recorded messages or pager notifications, sent over a standard telephone line.

Alarm Broadband Network™ by NextAlarm™ was built to solve these problems. Alarm Broadband Network™ allows customers to enjoy the benefits and cost savings of Voice-over-IP service, while still allowing their alarm systems to accurately communicate with our monitoring centers.

Alarm Broadband Network™ operates over a standard Cable Modem or DSL

Broadband (or other) Internet connection, and works with any alarm system capable of sending signals using the Contact ID or other format (including the Abbra Professional Series by NextAlarm™).

Alarm Broadband Network requires no changes to an existing alarm system, other than a one-time purchase of the ATA Broadband Modem from NextAlarm™ or other source. The consumer simply plugs the Broadband Modem into their home network, and plug their alarm panel into the modem (rather than into a regular telephone line), and NextAlarm™ almost immediately begins monitoring the consumer security system over Broadband. There may be no additional monthly service fees associated with Alarm Broadband Network™. Alarm Broadband Network™ requires no changes to a consumer's existing alarm system, other than a one-time purchase of the ATA Voice-over-IP adapter.

Alarm Broadband Network™ offers Line Security, a new security measure not available with standard telephone line hookups. Servers are in constant communication with the Broadband Modems installed at a consumer's home or business. If the servers lose contact with the device, an E-Notify service can alert the consumer in a matter of minutes. This extra security measure is only possible through the always-on, always-connected nature of Alarm Broadband Network. In contrast, in Prior Art dial-up alarms, signal loss might not be detected for hours or even days, if at all.

With Alarm Broadband Network™, when the consumer alarm system places a call to the central station, it does not go through the consumer's Voice-over-IP service. Alarm Broadband Network™ operates directly through the consumer's Broadband Internet Connection, and does not use the consumer's Voice-over-IP service. It runs alongside, rather than through, a consumer's Vonage, AT&T CallVantage, or other Voice-over-IP service.

If the consumer does not have Voice-over-IP service, they can still use Alarm Broadband Network™, so long as the consumer has Broadband Internet or other Internet connection. Even for customers who have regular telephone lines, Alarm Broadband Network™ offers the additional convenience of event reporting (such as opens and closes) in real-time without seizing a consumer's telephone line. In addition, Alarm Broadband Network™ offers the additional protection of Line Security, not available with standard telephone hook-ups.

It is unreliable to send alarm signals through a Voice-over-IP provider. When a consumer's alarm system tries to transmit a signal through a consumer's Voice-over-IP telephone service, it is handled like any other voice phone-call in the following fashion. A hardware device (VOIP Modem) at a consumer's location captures the audio from a consumer's panel and translates it into data. This data is sent over Broadband Internet to servers operated by a consumer's Voice-over-IP provider. A consumer's Voice-over-IP provider then re-transmits this data to a regional data center located in the city the consumer is dialing (where a consumer's alarm monitoring company resides). The regional data center will "pick up" a standard telephone line in the destination city, and dial a consumer's alarm monitoring company. Once the alarm-monitoring center answers the call, a consumer's Voice-over-IP company continues to be a middleman for the entire alarm-reporting event.

In the standard Voice-over-IP scenario, the data sent by a security system goes through so many "hops", and is translated back and forth between Internet data and audio so many times, that the reliability of the conversation is reduced to almost zero. The Alarm Broadband Network of the present invention is better as it handles alarm event reporting in the following manner. The Broadband Modem at a consumer location captures audio from an alarm panel and translates it into data. This data is sent over Broadband Internet to a server such as a NextAlarm™ Alarm Broadband Network™ server. NextAlarm™ Alarm Broadband Network™ servers immediately hand this data over to alarm monitoring equipment, with no further re-transmission necessary.

The main reason why the Alarm Broadband Network™ is more reliable, is that there is that no re-transmission of the consumer alarm panel's information back out to a standard telephone line is required. Once it is transmitted from a consumer's home or business to the Alarm Broadband Network™, the alarm signal data is received by, and immediately processed by a NextAlarm™ server.

In the present invention, a wireless or Ethernet over A/C power component is described, such that the Voice-over-IP equipment can be placed at a distance from a router, without the need to run an Ethernet cable from the VoIP equipment to the router. This arrangement is useful, as in many cases, the customer's security system is hidden within a closet, or else placed within the home or business at a significant distance from their Internet connection and router. The present invention accomplishes this by adding a built-in WiFi (wireless) radio, or a built-in Ethernet over Power circuit, into the Voice-over-IP equipment installed in the home or business.

DETAILED DESCRIPTION OF THE INVENTION

Figure 1:
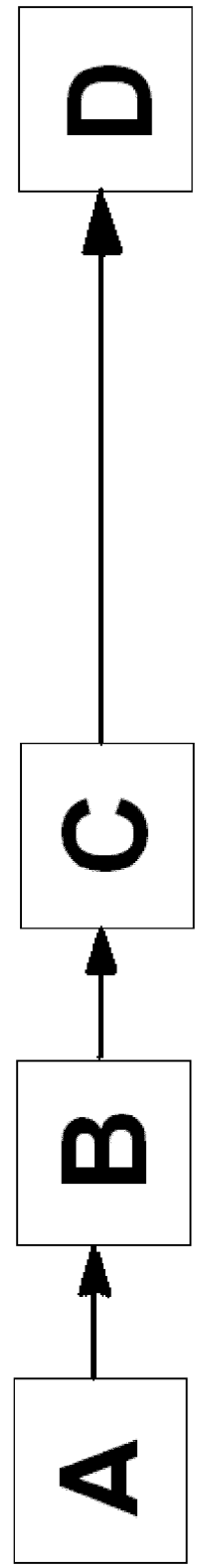
FIG. 1 is a simplified block diagram of a VoIP system.
Figure 2:
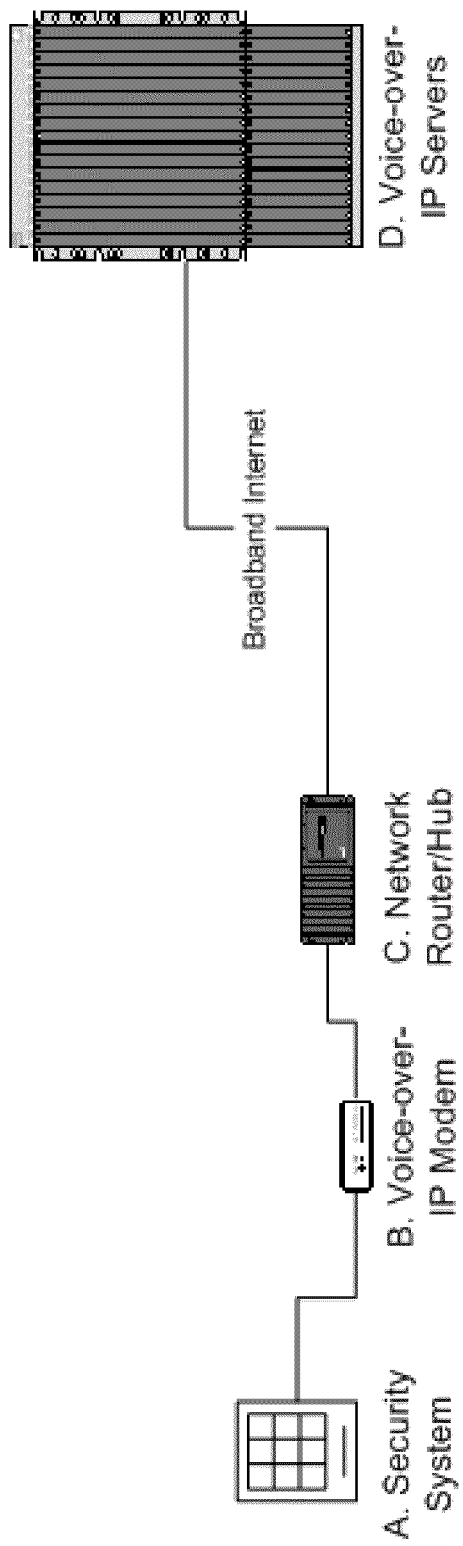
FIG. 2 is a more graphical block diagram of the block diagram of FIG. 1.

Voice-over-IP telephone services are typically offered in the following fashion as illustrated in FIGS. 1 and 2. The blocks in FIGS. 1 and 2 may be defined as follows. [A] represents Telephone equipment (such as a phone, a fax machine, or a home security system) is plugged into. [B] represents a VoIP modem (Voice-over-IP modem), a (typically) sub-$100 device that includes a telephone port and an Ethernet port. The VoIP modem is plugged via Ethernet into [C] a hub or router in the home or office, which is connected to the Internet via Broadband.

Once connected to the Internet, the VoIP modem [B] communicates with [D] a VoIP server or servers, at a remote facility (and usually operated by VoIP companies), which offers telephone services to its customers who connect to it using VoIP modems [B].

The VoIP modem then connects to a remote server over the Internet, while also offering a dial tone to the telephone device plugged into it. People who have alarm systems in their homes or businesses, and whose telephone lines are VoIP (instead of standard telephone lines), are concerned that, if their Broadband Internet connection were to go down, then their alarm system would not be monitored until the Broadband Internet connection is restored.

NextAlarm™ has invented new technology at point [D], the VoIP Server, which monitors in real-time the connectivity back to each customer's VoIP modem [B]. If the real-time connection to a customer's VoIP modem is interrupted, then the VoIP servers at [D] immediately take action. Thus, for example, if power is lost to the VoIP modem, or broadband service is interrupted, the NextAlarm™ server immediately notices the lack of signal from the consumer's alarm system. In contrast, in a Prior Art dial-up alarm, hours or days may pass before the Central Station notices a lack of alarm status calls. Thus, if a burglar attempts to thwart the system by cutting DSL or cable lines, the interruption of service itself may trigger an alarm.

In one variant, the action taken can be to generate an alarm signal on behalf of the customer and report it to the central station, such as the "Lost Central Station Polling" alarm signal, or even the "Panel Tampering Alert" alarm signal. In another variant, the action taken can be to generate an e-Mail message, SMS or Pager message, voice telephone call, Remote Procedure Call, or other electronic communication, in order to alert another computer system or alert people that the Broadband Internet connection at the customer's location has been interrupted. In another variant, the server will continue to monitor for the restoration of the communications with the VoIP modem, and should the device come back online, an "alarm restored" message can be transmitted in the same manners as previously described.

Figure 3:
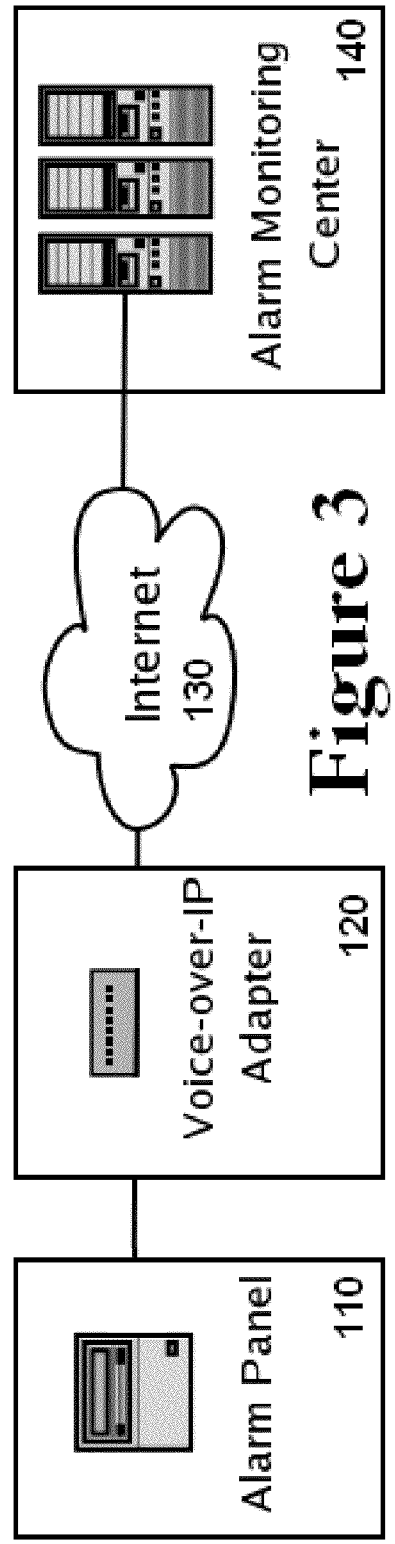
FIG. 3 is a more detailed block diagram of a first embodiment of the present invention.
Figure 4:
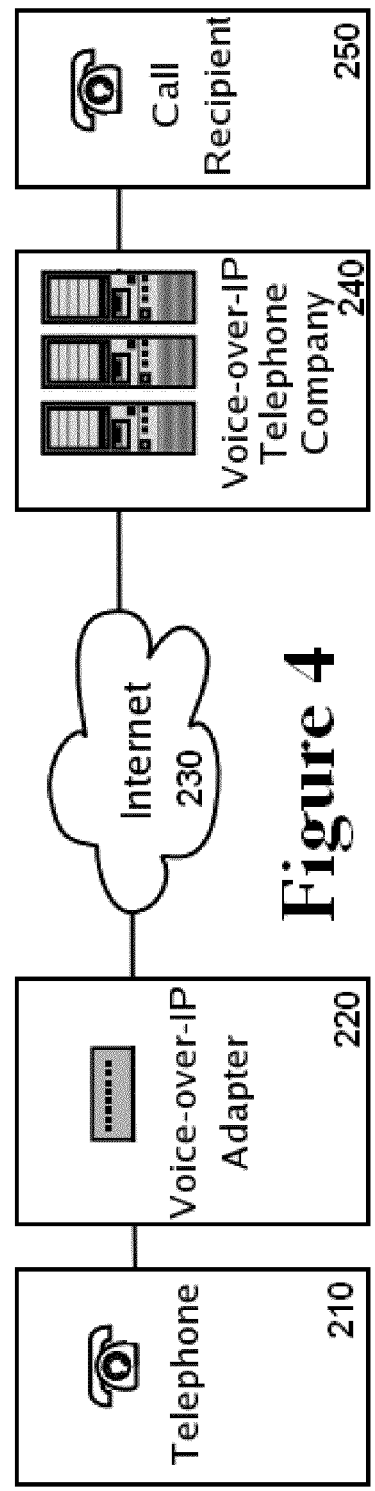
FIG. 4 is a block diagram of a Prior Art VoIP telephone system.

FIG. 3 is a more detailed block diagram of the invention of FIG. 2. Alarm panel 110 may output a signal to VoIP adapter 120. Note that in the present invention, a separate VoIP adapter may be provided just for the alarm panel. VoIP adapters (modems) such as the aforementioned LINKSYS adapter described previously, are relatively inexpensive. These adapters can be used in tandem with an existing VoIP adapter used for voice communications, and thus when the alarm system "calls out" regular phone service may not be interrupted.

Data from this dedicated VoIP adapter 120 is then sent over Internet broadband link 130 directly to monitoring center 140. Since the data is not re-converted to analog and dialed back out from a VoIP server to the monitoring center, an entire layer of D/A and A/D is eliminated, improving the robustness of the communications link.

Note that the VoIP adapter may be used for existing analog output alarm systems with little difficulty in installation, as the consumer merely plugs the VoIP adapter into the alarm system and Internet connection. In an alternative embodiment, a customized digital adapter may receive digital signals from alarm system 110 and output digital signals directly to Internet 130. Moreover, alarm panel 110 may be provided with such network capabilities built-in, and thus directly communicate over an Internet link as an Internet appliance. All of these embodiments are within the spirit and scope of the present invention.

The separate VoIP link of the present invention allows for yet another advantage. Since the monitoring center 140 is in direct communications with alarm panel 110, a user may be able to access alarm panel 110 through alarm center 140 via Internet connection 130. Thus, for example, a consumer can check, via website, e-mail, or telephone, whether the alarm system was set, and even set the alarm if someone forgot to set it. Moreover, a consumer can check alarm messages and determine whether the Police, Fire, or other emergency services need to be notified.

For example, if the alarm is set off at 10:00 AM and the consumer knows this is the time the maid usually arrives, they can check the status of the alarm through the Alarm Monitoring Center 140 on-line via a cellphone, Blackberry™ or computer, and determine whether the Police need to be summoned. The consumer can even disable the alarm if it was set off accidentally. In another scenario, the consumer can deactivate the alarm when service personnel (e.g., HVAC repair) are scheduled to arrive (or call from the home) so that repairs or other services can be provided. When the service personnel leave, the consumer can then reactivate the alarm remotely. The number of features and uses are really only limited by the imagination of the consumer and the possible scenarios.

Another advantage of the present invention is that Internet broadband connections that do not support VoIP communications for actual voice can still be used for alarm monitoring. For example, in many rural areas, consumers may be forced to use satellite uplinks such as Hughes™) DIRECTWAY™ satellite service. The DIRECTWAY™ service provides adequate bandwidth for Internet surfing and the like. However, due to the time lag of the satellite signal, it is not sufficient for actual voice communications using VoIP. Experiments with VoIP over satellite broadband show up to a 2 second delay in voice transmission and also poor signal quality for the upstream (uplink) voice signal.

However, the present invention can use VoIP modems to communicate alarm signals over such limited bandwidth connections. Moreover, the system of the present invention can be used with consumers who do not like or want VoIP telephone service (or for whom VoIP telephone service may not be possible). Again, since the system of the present invention is using a separate data path for the alarm signals, no interruption in phone service will occur when an alarm is triggered.

Installation of the system of the present invention can be performed by a consumer and may allow a service provider to achieve a "conquest" sale—that is, taking business away from an existing alarm monitoring company. If the consumer wants to change alarm companies, oftentimes such a change is made difficult by the use of proprietary equipment or the programming of the alarm to dial a particular number when an alarm signal is detected. As such, if the consumer wants to change alarm-monitoring companies, they have to either have their alarm system reprogrammed or have a new alarm panel installed. Both may require a visit from a service technician, which is costly and time-consuming.

In the co-pending applications cited previously, from which the present application claims priority and which are incorporated by reference, techniques are described for converting output from an alarm panel using an aftermarket device to redirect dialing information from an existing alarm monitoring company to a new alarm monitoring company. A simple redialer module may be inserted between the alarm system and the phone line, for example.

In the present invention, such a redialer may not be necessary. The alarm panel telephone output may be connected to a VoIP module, such as the LINKSYS™ device previously mentioned. The LINKSYS device may be suitably programmed or modified to directly connect to the new alarm company servers (e.g., NextAlarm™ servers), which may ignore outgoing dialing instructions from the alarm panel. This apparatus may be installed easily by the consumer by connecting the alarm phone line to the phone connector on the VoIP box, and an Internet connection (e.g., cat-5 cable or the like) from a cable modem, DSL modem, or the like, to the appropriate connector on the VoIP box. As a simple "plug and play" operation, the apparatus can be easily installed by the consumer.

In addition, since VoIP boxes are relatively inexpensive and readily available, installation of the system of the present invention is easy to achieve, without the need for special tooling and manufacture of dedicated re-dialers or the like. Note that the term "VoIP" as applied to the present invention is somewhat of a misnomer, as the alarm system is not transmitting actual "voice" signals over the Internet, but rather analog audio signals indicative of alarm data.

In an alternative embodiment of the present invention, digital data from an alarm system may be output directly to the Internet to the alarm monitoring company server. As in the first embodiment of the present invention, the server may continually monitor the alarm system and indicate an alarm or other notice when the connection is severed.

Parent U.S. Pat. 7,593,512, "Private VoIP Network for security system monitoring", incorporated by reference, and from which the present application claims priority in part, describes an invention in which standard Voice-over-IP equipment is deployed within the home or business, coupled to a home security system, and used to monitor that security system over Broadband Internet in which in turn utilizes a private VoIP network at the alarm monitoring center. This private VoIP network is dedicated to security system monitoring, for optimal reliability and configuration.

In the present invention, a wireless or Ethernet over A/C power component is described, such that the Voice-over-IP equipment can be placed at a distance from a router, without the need to run an Ethernet cable from the VoIP equipment to the router. This arrangement is useful, as in many cases, the customer's security system is hidden within a closet, or else placed within the home or business at a significant distance from their Internet connection and router. The present invention accomplishes this by adding a built-in WiFi (wireless) radio, or a built-in Ethernet over Power circuit, into the Voice-over-IP equipment installed in the home or business.

Figure 5:
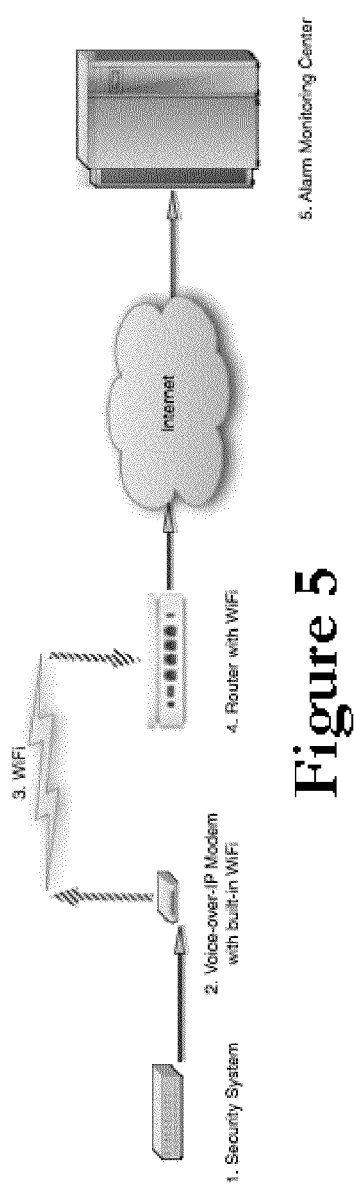
FIG. 5 is a block diagram illustrating a first scenario, in which the owner's Security System is conveying a typical home security event, such as "Front Door Opened", using protocols which are standard to the home security equipment industry.

Referring to FIG. 5, in a first scenario, the owner's Security System (1) may be conveying a typical home security event, such as "Front Door Opened", using protocols which are standard to the home security equipment industry. The Security System (1) is plugged into the dedicated Voice-over-IP modem (2) using a standard telephone cable. The Voice-over-IP modem then communicates wirelessly using WiFi (3) across the home or business, to the customer's home WiFi router or hub (4). The router then communicates over the Internet to the Alarm Monitoring Center (5), to convey the original message transmitted by the Security System (1) ("Front Door Opened").

Referring again to FIG. 5, Another feature of the invention is to monitor WiFi signal strength, between the VoIP modem with built-in WiFi (2) and the customer's WiFi base station or router with WiFi (4). The Modem may relay back to the Alarm Monitoring Center (5) a message indicating this signal strength. The Alarm Monitoring Center (5) may then act upon this information in any way it sees fit, including the possibility of (a) showing the user this signal strength on a control panel or display (including a website), or (b) alerting the user in real-time, if it is detected that the WiFi signal strength is low or is disconnected (e.g., VoIP Modem (2) fails to connect with Alarm Monitoring Center (5) after a predetermined interval. This embodiment of the present invention provides an important indication to the user that the WiFi base station may be too far for reliable alarm signal transmission, and that a new WiFi base station (or repeater, or antenna) may be necessary. Alternatively, the Alarm Monitoring Center (5) may alert the consumer (via website, middleware, cell phone, text message, or the like) when the WiFi connection (3) between the VoIP modem (2) and customers receiver (4) is broken, or if the security system (1) fails to report after a predetermined period of time or interval.

Figure 6:
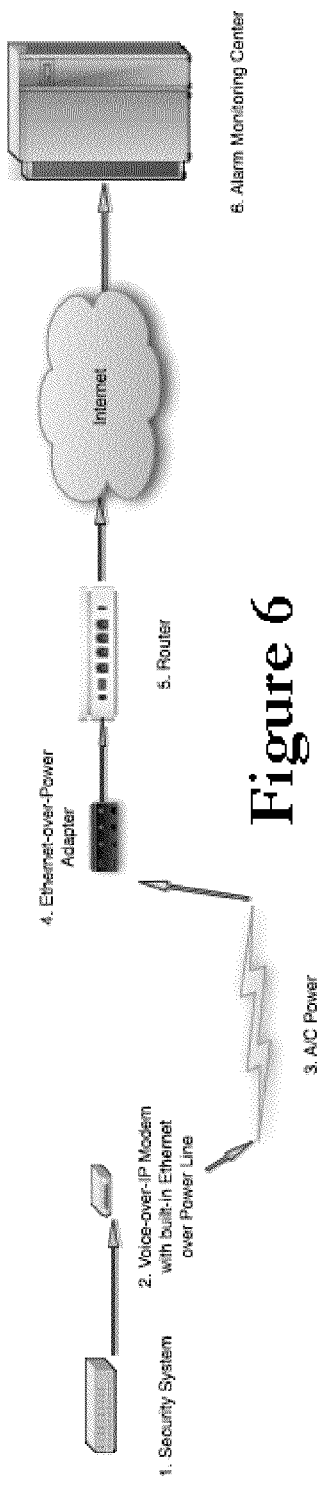
FIG. 6 is a block diagram illustrating a second scenario, the owner's Security System is conveying a typical home security event, such as "Front Door Opened", using protocols which are standard to the home security equipment industry.

Referring to FIG. 6, in a second scenario, the owner's Security System (1) may be conveying a typical home security event, such as "Front Door Opened", using protocols which are standard to the home security equipment industry. The Security System (1) is plugged into the dedicated Voice-over-IP modem (2) using a standard telephone cable. The Voice-over-IP modem then communicates using standard Ethernet-over-Powerline protocols (3) across the home or business. A standard Ethernet-over-Powerline adapter, (4), placed elsewhere in the home or business and near the customer's router, then receives this communication. The Ethernet-over-Powerline adapter (4) then transmits this signal to the customer's home router (5). The router then communicates over the Internet to the Alarm Monitoring Center (6), to convey the original message transmitted by the Security System (1) ("Front Door Opened").

Note that for purposes of illustration, the VoIP modem is illustrated as a separate component from the security system. However, in an alternative embodiment, this component may be built-in to the security system. The embodiments of FIGS. 5 and 6 allow the security system to be remotely located within a home or business premises, and thus avoid having to run network cabling or the like between the router and the alarm system. The embodiments of FIGS. 5 and 6 of the present invention are particularly useful when retrofitting an alarm system (an existing installation) for VoIP monitoring, as no additional network cabling is required, and the upgrade can be done as a "plug and play" type of installation by an end user.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method for monitoring over the Internet an existing alarm system having an analog telephone interface for outputting alarm signals, said method comprising the steps of:
    connecting the analog telephone interface from the existing alarm system to a dedicated Voice over Internet Protocol (VoIP) module connected to the Internet through a built-in wireless network connection connecting the VoIP module to an Internet interface,
    establishing a continuous VoIP connection from the dedicated VoIP module to an alarm monitoring server connected to the Internet through a digital Internet interface,
    monitoring the existing alarm system at the alarm-monitoring server connected to the Internet through a digital internet interface, and
    indicating at the alarm monitoring server, when the continuous VoIP connection between the alarm-monitoring server and the existing alarm system is broken.

2. The method of claim 1, further comprising the steps of:
    transmitting from the existing alarm system to the alarm-monitoring server, an alarm signal over the Internet, when an alarm condition is indicated by the existing alarm system, and indicating, from the alarm-monitoring server, that an alarm condition has been reported by the existing alarm system.

3. The method of claim 2, further comprising the step of: sending to a consumer from the alarm-monitoring server, a signal indicative that an alarm condition has been reported by the existing alarm system.

4. The method of claim 1, further comprising the step of: sending to a consumer from the alarm-monitoring server, a signal indicative that wireless network connection between the VoIP module and the Internet interface is broken.

5. The method of claim 1, further comprising the steps of:
    logging into the alarm-monitoring server by a consumer to access the existing alarm system, and receiving input from the consumer to perform one or more of: setting the existing alarm system, deactivating the existing alarm system, checking existing alarm system status, canceling an alarm on the existing alarm system, checking wireless signal strength of the wireless network connection, and programming the existing alarm system.

6. An alarm monitoring system comprising:
    an existing alarm system having an analog telephone interface for outputting alarm signals;
    a dedicated Voice over Internet Protocol (VoIP) module connecting the analog telephone interface from the existing alarm system to the Internet through a built-in wireless network connection connecting the VoIP module to an Internet interface, by establishing a continuous VoIP connection from the dedicated VoIP module to an alarm monitoring server via the wireless network connection, and connected to the Internet through a digital internet interface, the alarm-monitoring server connected to the Internet through a digital Internet interface, for receiving signals from at least one existing alarm system, the alarm-monitoring server including:
    a digital Internet interface for receiving signals from the at least one existing alarm system from the Internet, a monitoring system for detecting when continuous VoIP connection from the alarm-monitoring server to the at least one existing alarm system is broken, and a reporting system for reporting at least one of an alarm reported by the existing alarm system and when a connection from the alarm-monitoring server to the at least one alarm existing alarm system is broken.

7. The system of claim 6, wherein the alarm-monitoring server further includes: a communications system for sending a signal to a consumer indicative that an alarm condition has been reported by the existing alarm system.

8. The system of claim 6, wherein the alarm monitoring-server further includes: a communications system for sending a signal to a consumer indicative that the wireless network connection between the VoIP module and the Internet interface is broken.

9. The system of claim 6, wherein the alarm-monitoring server further includes:

a consumer interface allowing a consumer to log into the alarm-monitoring server by a consumer to access the existing alarm system, and receive input from the consumer to perform one or more of: setting the existing alarm system, deactivating the existing alarm system, checking existing alarm system status, canceling an alarm on the existing alarm system, checking wireless signal strength of the wireless network connection, and programming the existing alarm system.

10. A method of redirecting a communication path from an existing alarm system having an analog telephone interface for outputting alarm signals to communicate with an alarm company, comprising the steps of:

disconnecting the existing alarm system having an analog telephone interface for outputting alarm signals from a telephone line, connecting the existing alarm system analog telephone interface to a dedicated Voice over Internet Protocol (VoIP) module having a built-in wireless networking module connecting the VoIP module to the Internet through an Internet interface, the VoIP module programmed to communicate with an alarm-monitoring server, and connecting the dedicated VoIP module in a continuous VoIP connection from the dedicated VoIP module through built-in wireless networking module and Internet interface to an alarm monitoring server connected to the Internet through a digital Internet interface, wherein the existing alarm system communicates with the alarm-monitoring server through the module over the Internet connection.

11. A method for monitoring over the Internet an existing alarm system having an analog telephone interface for outputting alarm signals, said method comprising the steps of:

connecting the analog telephone interface from the existing alarm system to a dedicated Voice over Internet Protocol (VoIP) module connected to the Internet through a Ethernet-over-Powerline adapter, connecting the VoIP module to an Internet connection, establishing a continuous VoIP connection from the dedicated VoIP module to an alarm monitoring server connected to the Internet through a digital Internet interface, monitoring the existing alarm system at the alarm-monitoring server connected to the Internet through a digital internet interface, and indicating at the alarm monitoring server, when the continuous VoIP connection between the alarm-monitoring server and the existing alarm system is broken.

12. The method of claim 11, further comprising the steps of:

transmitting from the existing alarm system to the alarm-monitoring server, an alarm signal over the Internet, when an alarm condition is indicated by the existing alarm system, and indicating, from the alarm-monitoring server, that an alarm condition has been reported by the existing alarm system.

13. The method of claim 12, further comprising the step of: sending to a consumer from the alarm-monitoring server, a signal indicative that an alarm condition has been reported by the existing alarm system.

14. The method of claim 11, further comprising the step of: sending to a consumer from the alarm-monitoring server, a signal indicative that connection between the VoIP module and the Internet interface is broken.

15. The method of claim 11, further comprising the steps of:

logging into the alarm-monitoring server by a consumer to access the existing alarm system, and receiving input from the consumer to perform one or more of: setting the existing alarm system, deactivating the existing alarm system, checking existing alarm system status, canceling an alarm on the existing alarm system, and programming the existing alarm system.

16. An alarm monitoring system comprising:

an existing alarm system having an analog telephone interface for outputting alarm signals;

a dedicated Voice over Internet Protocol (VoIP) module connecting the analog telephone interface from the existing alarm system to the Internet through an Ethernet-over-Powerline adapter connection by establishing a continuous VoIP connection from the dedicated VoIP module to an alarm monitoring server via the Ethernet-over-Powerline adapter connecting the VoIP module to digital internet interface connected to the Internet, the alarm-monitoring server connected to the Internet through a digital Internet interface, for receiving signals from at least one existing alarm system, the alarm-monitoring server including:

a digital Internet interface for receiving signals from the at least one existing alarm system from the Internet, a monitoring system for detecting when continuous VoIP connection from the alarm-monitoring server to the at least one existing alarm system is broken, and a reporting system for reporting at least one of an alarm reported by the existing alarm system and when a connection from the alarm-monitoring server to the at least one alarm existing alarm system is broken.

17. The system of claim 16, wherein the alarm-monitoring server further includes: a communications system for sending a signal to a consumer indicative that an alarm condition has been reported by the existing alarm system.

18. The system of claim 16, wherein the alarm monitoring-server further includes: a communications system for sending a signal to a consumer indicative that connection between the VoIP module and the Internet interface is broken.

19. The system of claim 16, wherein the alarm-monitoring server further includes:

a consumer interface allowing a consumer to log into the alarm-monitoring server by a consumer to access the existing alarm system, and receive input from the consumer to perform one or more of: setting the existing alarm system, deactivating the existing alarm system, checking existing alarm system status, canceling an alarm on the existing alarm system, and programming the existing alarm system.

20. A method of redirecting a communication path from an existing alarm system having an analog telephone interface for outputting alarm signals to communicate with an alarm company, comprising the steps of:

disconnecting the existing alarm system having an analog telephone interface for outputting alarm signals from a telephone line, connecting the existing alarm system analog telephone interface to a dedicated Voice over Internet Protocol (VoIP) module having a built-in Ethernet-over-Powerline adapter connecting the VoIP module to an Internet interface, the VoIP module programmed to communicate with an alarm-monitoring server, and connecting the dedicated VoIP module in a continuous VoIP connection from the dedicated VoIP module through the Ethernet-over-Powerline adapter and Internet interface to an alarm monitoring server connected to the Internet through a digital Internet interface, wherein the existing alarm system communicates with the alarm-monitoring server through the module over the Internet connection.

\* \* \* \* \*